(12) United States Patent
Keung (10) Patent No.: US 6,665,797 B1
(45) Date of Patent: Dec. 16, 2003

(54) PROTECTION OF SOFTWARE AGAIN AGAINST UNAUTHORIZED USE

(76) Inventor: Tse Ho Keung, P.O. Box 54670, North Point Post Office (HK)

( * ) Notice: Subject to any disclaimer, the term of this patent is extended or adjusted under 35 U.S.C. 154(b) by 0 days.

(21) Appl. No.: 09/112,276

(22) Filed: Jul. 9, 1998

Related U.S. Application Data (63) Continuation-in-part of application No. 08/587,448, filed on Dec. 1, 1995.

(51) Int. Cl.[7] .............................................. H04L 12/22
(52) U.S. Cl. ............................. 713/193; 705/51; 705/59
(58) Field of Search .......................... 705/51, 52, 56, 705/58, 59; 713/193

(56) References Cited

U.S. PATENT DOCUMENTS

| | | | | |
|---|---|---|---|---|
| 4,796,181 A | * | 1/1989 | Wiedemer | 705/52 |
| 5,155,680 A | * | 10/1992 | Wiedemer | 705/52 |
| 5,586,186 A | * | 12/1996 | Yuval et al. | 380/30 |
| 5,719,938 A | * | 2/1998 | Haas et al. | 380/281 |
| 5,737,416 A | * | 4/1998 | Cooper | 705/51 |

* cited by examiner

*Primary Examiner*—Gilberto Barron (57) ABSTRACT

A central program comprising a EI sub-program for providing identity information of the rightful user thereof for accessing a network central computer to obtain service(s) or software product(s) or alike, in which a secure operation on an account of the rightful user for payment therefor involved; and a AS sub-program for using the existence of the EI sub-program in a computer as a precondition for authorising use of those software products obtained on that computer. The central program is for managing the use of the individual sub-programs therein so that the AS sub-program can be protected from being copied individually.

22 Claims, 1 Drawing Sheet

THE CENTRAL PROGRAM

PROTECTION OF SOFTWARE AGAIN AGAINST UNAUTHORIZED USE

This is a continuation-in-part of patent application Ser. No. 08/587,448, filed on Dec. 1, 1995, which is still pending.

FIELD OF THE INVENTION

The present invention relates to protection of software, and particularly, to protection of software against unauthorised use or copying.

BACKGROUND OF THE INVENTION

Conventionally, software protection methods for protecting commercial software products such as programs, multimedia software, distributed through a communication network, such as a telephone system, require a user computer to have a piece of hardware comprising decryption keys and system be installed therein, for to be authenticated by a software program running on the computer. Hardware, rather than software, are being used because software duplication facilities are commonly found in personal computers. However, this is extremely cumbersome and places a large burden on users and vendors alike.

It is therefore an object of the present invention to provide a piece of software to replace the above-mentioned piece of hardware and the rightful user of that piece of software is being discouraged from copying it to someone else, by means of a psychological barrier.

It is therefore another object of the present invention is to provide a method to discourage a rightful user from copying his software to someone else.

SUMMARY OF THE INVENTION

According to a first embodiment of the present invention, there is provided a central program comprising 1) a sub-program for providing an Encrypted Identity (herein below referred to as EI sub-program), 2) a sub-program for authorising use of a software product (herein below referred to as AS sub-program), 3) a sub-program for authenticating user computer (herein below referred to as AC sub-program).

The central program is for managing the use of the individual sub-programs therein so that the AS sub-program can be protected from being accessed directly, thereby preventing it from being copied individually. The EI sub-program is for providing identity information(an encrypted identity) of its rightful owner for accessing a network central computer to obtain services or software products or alike in which a secure operation on a user account of that owner for payment therefor involved. The AC sub-program is for authenticating the computer on which it runs as being a particular predetermined computer, by determining the hardware and software configuration as well as hardware characteristics of that computer by software means and comparing the result with that required. The AS sub-program is for using the authentication result of the AC sub-program and the existence of the EI sub-program which being not protected against unauthorised use and being capable of being used by any user thereof, on a computer, as preconditions for authorising those software products "which may be purchased commercial computer software" obtained to be used on that computer.

It should be noted that in the central program, as far as protection of the software products from being unlawfully copied by the rightful user to someone else is concerned, the AS sub-program is the only sub-program which needs protection and according to the present invention, the AS sub-program is protected from being unauthorised copied by its rightful user to someone else lies on the fact that a rightful user would not copy a software, i.e., the central program in which the EI sub-program exists and which can be used by an unauthorised user to provide the rightful user's identity information for using the rightful user's account in obtaining, for eg., network services or software products, to someone else. As seen from the use of automatic teller machine(ATM) magnetic cards, which although can readily be forged, has been proved to be remarkably secure.

According to a second embodiment of the present invention, the central program comprising the EI sub-program only, and the AS sub-program become an individual program which authorises the software product(s) to be used only when the EI sub-program exists in the same computer it runs and which is being determined by receiving an encrypted identity of the EI sub-program from the same.

According to a third embodiment, the EI and AS sub-programs are basically equivalent such that copying the AS sub-program by its rightful user to someone else is equivalent to copying the EI sub-program to someone else, thereby preventing the AS sub-program from unauthorised copying or use.

DETAILED DESCRIPTION OF THE PREFERRED EMBODIMENTS

The present invention is directed to protecting software product(s) distributed through a communication network, against unauthorised copying or use, and for the sake of simplicity, the following description is directed to protection of such software product(s) stored in a user's IBM PC computer. And, the present invention will be described under the following headings:

1) The Central Program.
2) The Sub-program for providing an Encrypted Identity (EI sub-program).
3) The Sub-program for authorising use of a software product (AS sub-program).
4) The Sub-program for authenticating user computer (AC sub-program).
5) Other Embodiments.

1) The Central Program.

Figure 1:
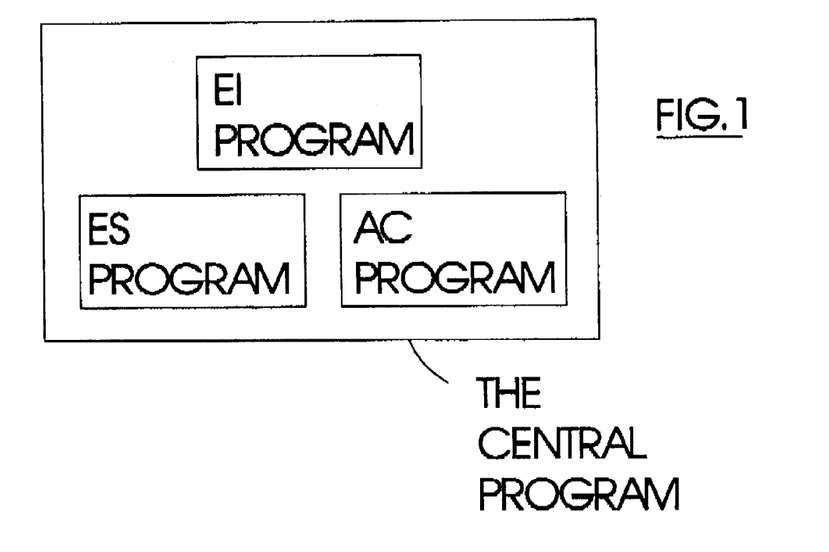
FIG. 1 is a block diagram of the central program.

According to the first embodiment, there is provided a central program which being an executable program and can be caused to be executed a) by user by entering its filename in DOS environment, b) by a running program. FIG. 1 is a block diagram of the central program, details are provided as follows:

a) If a user desires to access a network central computer through a communication link, the user has to cause the central program to be executed. The central program will request the user to enter a password to enable its operation and if the password coincidents with that required, it will be responsive to user's command(s) to send an encrypted identity of its rightful user, who should be that user, to the central computer.

This requirement of user password is necessary to prevent someone to access the central computer and use the account of the rightful user without his authorisation.

The central program will cause the EI sub-program, of which details will be described herein below, to be executed for providing an encrypted identity of the user, to the central computer. The central computer will permit the access request from the user if the encrypted identity is correct, for which details will be described in item 2 herein below.

b) When a running program desires to cause the AS sub-program to be executed, to authorise it to continue to run, it will first prepare an input parameter for indicating to the central program such a request and store the input parameter in a predetermined location in RAM, then through the use of a PC DOS service call for that purpose, cause the central program to be executed. If the central program is being enabled previously by the above-mentioned password, it will access the input parameter in the predetermined location and from it the central program can determine that a running program is requesting for an authorisation command from the AS sub-program, and will then cause the AS sub-program to be executed. Otherwise, the central program will not cause the AS sub-program to authorise the running program to continue to run. As the password is a password for enabling use of AS sub-program, as well as the EI sub-program, the rightful user is discouraged from providing the password to someone else, in order that the someone else can use his AS sub-program.

For the case the central program is being caused by user to be executed, there will be no valid or no input parameter and the central program can thus know this fact.

2) The sub-Program for Providing an Encrypted Identity (EI Sub-program).

This sub-program uses the method used in IC credit card for identity authentication and in which an encrypted identity is generated.

When starts, the EI sub-program sends an access request to the central computer which in return will send back a random number. The EI sub-program will then encrypt the random number with a predetermined algorithm Al and send the result to the central computer which will permit access if the result is identical with another result it obtained by performing the same encryption algorithm on that random number.

It should be noted that for each user, there is a corresponding respective encryption algorithm Al for the identity authentication thereof and also that the central computer may use the encryption result received from the EI sub-program, if it being correct, as a user authorisation for payment to be made, from a user account for obtaining network services or software products or the like.

3) The sub-Program for Authorising Use of a Software Product (AS Sub-program).

According to the present invention, there are 2 approaches for authorising a software product to be used:

i) by sending encrypted command to a running software program for authorising it to continue to run on a computer, in a similar manner as that mentioned above in item 2 for identity authentication. Specifically, the running software program includes in the input parameter, as mentioned above in item 1b, a random number it generated, then causes the central program to be executed. The AS sub-program, which being caused to be executed by the central program, as mentioned above in item 1b, sends the result it obtained by performing a predetermined encryption algorithm A2 on that random number, to the running software program which will accept the encrypted command and continue to run, if the result is identical to another result it obtained by performing the same encryption algorithm A2 on that random number.

It should be noted that continuous use of the software program requires continuously receiving encrypted commands.

It should also be noted that for each user, each of the software products for use on his/her computer(s) use a same respective encryption algorithm A2 and the encryption algorithm A2 being included into each such software product by the central computer at the time when the central computer is to supply the same to the user computer.

ii) by decrypting an encrypted part of a software product or a completely encrypted software product.

It should be noted that if the software product is a program, then it will be sufficient to have a part thereof to be encrypted, for preventing unauthorised copying and use, however, if the software product is an audio/visual multimedia data file, it should be more desirable to have the whole software product be encrypted.

Figure 2:
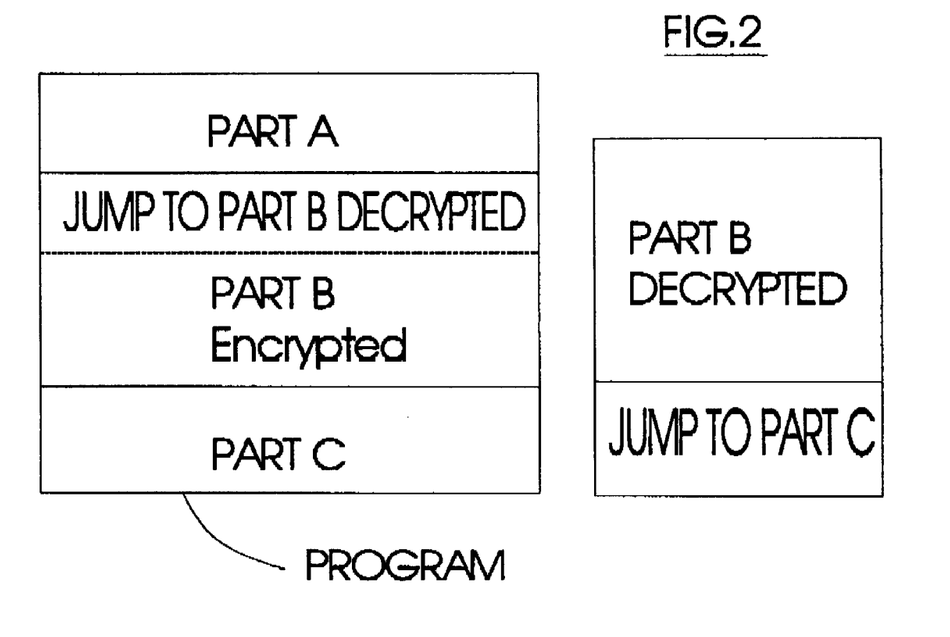
FIG. 2 is a diagrammatic view of a program in which a part B thereof being encrypted, in RAM space.

The decryption of a part of or an entire software product takes place on a temporary copy of which in RAM, and that temporary copy should no longer exist after user finish using the software product, so as to prevent illegal copy from being made. Given by example only, FIG. 2 is a diagrammatic view of a program in RAM space, with a part B thereof being encrypted. As seen, the AS sub-program decrypts part B and stores the result which size should be not equivalent to that of the encrypted copy, in 'part B decrypted'.

The AS sub-program then overwrites at the first location of 'part B encrypted' an instruction 'JUMP TO part B decrypted' and at the end of 'part B decrypted' appends an instruction 'JUMP TO part C'. In this way, the encrypted part of the software will not be executed and the decrypted part will be executed instead.

In the case of audio/visual multimedia software, the software will be decrypted a small part by a small part and each small part is decrypted at the time it is about to be utilized by a audio/visual program for causing audio/visual effect. In other words, that audio/visual program has to cause the AS sub-program to be executed in the manner as described above in item 1b, everytime it wants a decryption of a small part. Desirably, a newly decrypted small part will overwrite a previously decrypted one so that a whole copy of the decrypted software will not exist in RAM.

4) The sub-Program for Authenticating User Computer (AC Sub-program).

The AC sub-program for authenticating a computer on which it runs as being a particular predetermined computer, and prevent use of protected software if the computer is not, and its operation is under control of the central program.

Specifically, when the central program is being installed in a harddisk of a user computer and executed, it will check an encrypted status information stored in itself and from which it knows this is the first time it being executed and will cause an initialization process to take place. In the initialization process, the central program sends to the central computer, as mentioned herein above in item 2, an unencrypted identity of the rightful user of the central program, then the AC sub-program requests for an encrypted command from the central computer which will provide such an encrypted command, in the manner as described hereinabove in item 3i, if the rightful user has a valid account which is not closed.

After authenticating the command, the AC sub-program determines the hardware and software configuration of the user computer, which includes, for eg., identities of peripherals such as mouse, printer, joystick, harddisk and floppy disk drive etc; characteristics of hardware such as running speed determination which is a function of CPU frequency, cache memory size etc; number and number of heads, cylinders, sectors of harddisk and locations of bad sectors therein; version number of operation system software and physical position of a particular software product including the central program in the harddisk; by skills well known to those in the art. For instance, the running speed can be determined by causing the computer to execute a test program and initializing a hardware counter to measure the time the computer has taken to finish executing the program. For another instance, the version number of the operation system may be determined by using a particular DOS service call.

The result of the determination and a status information indicative of the central program being initialized will be stored by the AC sub-program in a predetermined part of the central program in the harddisk, in the form of encrypted data. Thereafter, everytime when the central program is executed, it will first check the status information, and after determining that it is being initialized, it will perform a job as requested, as mentioned in item 1 herein above, and in addition thereto, it will also automatically cause the AC sub-program to be executed which will determine at least a part of the above-mentioned hardware and software configuration as well as hardware characteristics of the computer on which it runs, at a time, and the AC sub-program will encrypt an indication information in another predetermined part of the central program for causing the AS sub-program not to operate, if any part of the configuration/characteristics determined is not identical to the corresponding part of that it encrypted and stored previously.

In addition thereto, the AC sub-program will also reset the encrypted status information so that another initialization process will automatically take place when the user causes the central program to be executed, and for the authorisation of which another encrypted command from the central computer will be required.

This prevents a user from deliberately adapting the central program to computer of other user(s), after closing his account.

In addition, the encrypted command from the central computer may alternatively be supplied to the user via, e.g., a telephone line, and then entered into the user computer by the user. Specifically, to request for an encrypted command, the AC sub-program generates a random number and conveys the random number to the user who in turn supplies it to the central computer by means of telephone dual tone signals, generated by entering the random number on a telephone keypad, through the telephone line, and after encrypting the random number, the central computer sends the result to the user via the same telephone line by means of a voice synthesizer.

5) Other Embodiments

According to the second embodiment, the AS sub-program is separated from the central program and become an independent program, whereas the central program comprises the EI sub-program only. The AS program is bound to the EI sub-program by requiring the AS program to operate only when the EI sub-program exists in the same computer. Specifically, the AS program when running, can cause the EI sub-program to be executed for generating an encrypted identity for the AS program to authenticate. The EI sub-program knows that this is a request for encrypted identity from the AS program, not a request from user for encrypted identity for accessing the central computer, by the method of input parameter as mentioned above in item 1*b*.

Further, the EI sub-program before sending the encrypted identity to the AS program, may first check the data integrity of itself by, for instance, checksum method. Alternatively, it may also be that the AS program performs the checking. And, if the checking result is that some data in the EI sub-program being altered, then in the former case, the AS will be caused to be not operable by the EI sub-program by not sending it an encrypted identity, and in the latter case, the AS program will be caused to be not operable by itself.

According to the third embodiment, the encryption algorithms A1 and A2 that the EI and AS sub-programs use respectively for providing an encrypted identity to the central computer and for generating encrypted commands to authorise use of a software product respectively, is a same algorithm.

Thus, it would be equivalent for a rightful user to copy his EI sub-program to someone else if he copies his AS sub-program to someone else. In this case, a slight modification on the AS sub-program can make it equivalent to the EI sub-program and which involves adding a simple interface program for receiving a random number from the central computer, feeding the random number into the AS sub-program, receiving the encryption result from the AS sub-program and supplying the encryption result to the central computer, and such functions are commonly found in any network interface software. Alternatively, the A1 and A2 algorithms may be 2 different algorithms, but information representative of the A1 algorithm is being included into the AS sub-program and be accessible by user or when the AS sub-program being executed, capable of being used by AS sub-program to perform the corresponding encryption function which being user-usable.

In addition, according to another embodiment of the present invention, the software products and AS sub-program each includes an identity of its rightful user, so as to facilitate legal action against piracy. Further, the AS sub-program, when executed, will access each of the software products, by using a particular DOS service call for loading a software product stored in the computer on which it runs, from harddisk to RAM, one by one, for checking such an identity therein, if any software product is found to have an identity not identical to that of the AS sub-program, the AS sub-program will inhibit use of all software products under its control, including itself, on the computer. Such identities may be stored in a predetermined location of the software products, and is protected from being altered by having an encrypted one stored in another location in each software product, and each of those another locations is different in different software products so that it would not be discovered and altered. And, each such software product, when executed, will automatically check the unencrypted identity stored therein against the decryption result of the encrypted one, if they are not consistent, the software product will fail to operate. The identity or encrypted identity of the rightful user being included into each of the software products by the central computer at the time when the central computer is to supply the same to the user computer. Further, to prevent the AS sub-program from mistakenly regarding a software product which stored in the computer and which being not supplied from the central computer, as a software product under its control, the central computer may further include information in a third predetermined location of each software product for indicating this fact, that is, the software product being supplied from the central computer, to the AS sub-program and each software product will not operate if when being executed, it finds that information therein being altered.

It should be noted that the above embodiments are given by way of example only, and it will be obvious to those skilled in the art that various changes and modifications may be made without departing from the spirit of the present invention.

What is claimed is:

1. A method for protecting publicly distributed software from unauthorised use, comprising the steps of:
   determining if identity information, is existing in a processing apparatus;
   using a positive result of said determination as a pre-condition for causing said processing apparatus to provide user access to said software desired to be protected;
   wherein:
      said identity information, if so existing, being capable of being used in enabling electronic commerce operation(s) for which rightful user(s) of said software desired to be protected has to be responsible;
      access to said software desired to be protected is being provided without causing a said operation being performed and said identity information being specific to said rightful user(s).

2. A method for protecting software from unauthorised use, as claimed in claim 1, wherein further comprising the steps of:
   authenticating said identity information;
   determining said identity information as existing, if said identity information being authentic and as not existing if otherwise.

3. A method for protecting software from unauthorised use, as claimed in claim 1, wherein said operation being operation related to making payment from an account of said rightful user(s), for obtaining a service/product.

4. A method for protecting software from unauthorised use, as claimed in claim 1, wherein said software desired to be protected comprises a plurality of protected programs; each of said protected programs having validity information in a first predetermined location therein for indicating a valid identity of its rightful user exists in a second predetermined location therein, and an encrypted identity of its rightful user therein; and each of said protected programs, when being executed, will fail to operate if said validity information therein being altered, or said identity therein and the decryption result of said encrypted identity therein being inconsistent.

5. A method for protecting software from unauthorised use, as claimed in claim 4, wherein further comprising the steps of:
   storing an encrypted identity of a user in said processing apparatus; and if all of said protected programs stored in said processing apparatus has a valid user identity which being consistent with the decryption result of said stored encrypted identity, permitting use of said protected programs and not permitting if otherwise.

6. A computer software product for protecting software publicly and individually distributed against unauthorised use;
   said software product comprising:
      identity program code for enabling electronic commerce operation(s) for which rightful user(s) of said software desired to be protected has to be responsible;
      authorising software effectively under the control of said rightful user(s) for, when executed, providing user access to said software desired to be protected, without causing a said operation being performed;
      a computer readable medium having said identity program code and said authorising software;
      wherein:
         said identity program code and said authorising software are stored in said medium in such a manner that said authorising software is prevented from being copied therefrom individually; and
         the improvement resides in said protection basing on no hardware and/or software specific to said rightful user(s) other than said identity program code and said identity program code being specific to said rightful user(s).

7. A computer software product as claimed in claim 6, wherein said operation being operation related to making payment from an account of said rightful user(s).

8. A computer software product as claimed in claim 6, wherein said authorising software contains said identity program code therein.

9. A computer software product for protecting other software against unauthorised use, comprising:
   authorising program for, when being executed on a processing apparatus, providing user access to said software desired to be protected;
   a computer readable medium having said authorising program
   wherein:
      information specific to rightful users) of said software desired to be protected, exists in said authorising program as a part thereof;
      said existing information being capable of being used in enabling electronic commerce operation(s) for which said rightful user(s) has to be responsible, but not being usable by said processing apparatus for said electronic commerce purpose, when said authorising program being loaded on said processing apparatus as a part thereof, and access to said software desired to be protected is being provided without causing a said operation being performed.

10. A computer software product as claimed in claim 9, wherein said operation being operation related to making payment from an account of said rightful user(s).

11. A method for protecting publicly distributed software from unauthorised use, comprising the steps of:
   obtaining first information from a user of a processing apparatus having an identity software;
   using said first information received being correct as a pre-condition for causing said processing apparatus to provide user access to said software desired to be protected;
   wherein:
      said identity software being for providing a second information specific to rightful user(s) of said software desired to be protected, if said correct first information is being obtained from a user thereof; and said second information being capable of being used in enabling electronic commerce operation(s) for which said rightful user(s) has to be responsible;
      access to said software desired to be protected is being provided without causing a said operation being performed.

12. A method for protecting software from unauthorised use, as claimed in claim 11, wherein said operation being operation related to making payment from an account of said rightful user(s) and said first information being a password.

13. A method for protecting software from unauthorised use, as claimed in claim 11, wherein said software desired to be protected being first software used on said processing apparatus for determining third information related to hardware and/or software of said processing apparatus;
   wherein further comprising second software for, when being executed, authenticating the identity of the computer on which said second software runs as being said processing apparatus, basing on at least a part of said third information;

and for providing user access to third software if said computer has an authentic identity.

14. A method for protecting publicly distributed software from unauthorised use, comprising the steps of:

authenticating identity information associated with a processing apparatus;

using a positive result of said authentication as a pre-condition for causing said processing apparatus to provide user access to said software desired to be protected;

wherein said identity information existing in such a manner that said identity information being capable of being used in enabling electronic commerce operation (s) for which rightful user(s) of said software desired to be protected has to be responsible;

wherein access to said software desired to be protected is being provided without causing a said operation being performed and said identity information being specific to said rightful user(s).

15. A method for protecting software from unauthorised use, as claimed in claim 14, wherein said operation being operation related to making payment from an account of said rightful user(s).

16. A method for protecting software from unauthorised use, comprising the steps of:

(a) obtaining by protection software running on a processing apparatus, say, first processing apparatus, first information from the user thereof;

(b) determining by said protection software, from said processing apparatus second information related to the hardware or/and software thereof for future reference in step (c) below, in response to said first information obtained being consistent with third information contained in said protection software, thereafter (c) authenticating a processing apparatus, say, second processing apparatus, basing on at least a part of said second information;

(d) using a positive result of said authentication as a pre-condition for permitting use of said software desired to be protected on said second processing apparatus;

wherein said third information being confidential information of a rightful user of said software desire to be protected and being necessary for enabling electronic commerce transaction(s) for which said rightful user has to be responsible; and said method is being performed without causing a said transaction take place.

17. A method for protecting software from unauthorised use, as claimed by claim 12, wherein said software desired to be protected being purchased commercial software.

18. A method for protecting software from unauthorised use, by restricting the use thereof to be under control of a single person, comprising a sub-method; said sub-method comprising the steps of:

(a) establishing a communication between a processing apparatus, say, first processing apparatus and a remote electronic transaction system;

(b) verifying said person having a valid account, by said remote electronic transaction system, basing on authenticated information related to said person, said information being communicated to said remote electronic transaction system from said processing apparatus;

(c) using a positive result of said verification as a pre-condition for permitting use of said software on said first processing apparatus;

wherein said sub-method a cost is being charged from said account; and thereafter, said sub-method being capable of being used on a processing apparatus, say, second processing apparatus, without re-charging from said account said cost.

19. A method for protecting software from unauthorised use, as claimed by claim 18, wherein no charge for repeating said sub-method.

20. A method for protecting software, for use by a user, from unauthorised use; comprising a sub-method;

wherein said sub-method a protection software being used and "the presence of identity information in a processing apparatus" is being used in the creation of said protection software as an "installation" pre-condition for said protection software to perform in said processing apparatus step (a) below; and said identity information being specific to said user and capable of being used in enabling electronic commerce operation(s) for which said user has to be responsible;

said sub-method comprising the steps of:

(a) determining by said protection software running on a processing apparatus, say, first processing apparatus with said "installation" precondition being met, first information related to the hardware or/and software of said first processing apparatus, for future reference in step (c) below; thereafter (b) determining from a processing apparatus, say, second processing apparatus, second information related to the hardware or/and software thereof;

(c) determining if said second information is consistent with said first information;

(d) using a positive result of said determination of consistence as a pre-condition for permitting use of said software desired to be protected on said second processing apparatus, with said "installation" pre-condition not being met;

thereafter, said sub-method being capable of being used on a processing apparatus, say, third processing apparatus, without causing any user responsible operation(s) being performed therefor and with no step relating to a new user payment therefor.

21. A method for verifying identity of a user of a data processing apparatus, comprising the steps of:

receiving, by said data processing apparatus, information specific to a user and necessary for accessing an account of said user;

verifying said account being valid, by an electronic transaction system by use of said information received by said data processing apparatus;

using by said data processing apparatus, a positive result of said verification as a precondition for providing user access to at least a part of the functionality of said data processing apparatus;

wherein said method is being performed without charging said account and said at least a part of functionality being not related to said validity status of said account.

22. A software product comprising a computer readable medium having computer code for causing one or more processing apparatus to perform the method of claim 1, 12, 14, 16, 18, 20 or 21.

* * * * *

UNITED STATES PATENT AND TRADEMARK OFFICE
CERTIFICATE OF CORRECTION

PATENT NO. : 6,665,797 B1
DATED : December 16, 2003
INVENTOR(S) : Ho Keung, Tse

It is certified that error appears in the above-identified patent and that said Letters Patent is hereby corrected as shown below:

Title page,
Item [75], Inventor, "Keung" should be -- Tse --

Signed and Sealed this

Twenty-seventh Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,665,797 B1
DATED : December 16, 2003
INVENTOR(S) : Ho Keung, Tse

It is certified that error appears in the above-identified patent and that said Letters Patent is hereby corrected as shown below:

Title page,
Item [54], Title, "PROTECTION OF SOFTWARE AGAIN AGAINST UNAUTHORIZED USE" should be -- COMPUTER APPARATUS/SOFTWARE ACCESS RIGHT MANAGEMENT --;

Column 1,
Line 8, insert -- /data processing apparatus -- after "protection of software";
Line 9, delete "software" and insert -- them --;
Line 10, insert -- /illegitimate -- after "unautho-rised";
Line 10, "or copying" should be deleted;
Line 14, after "Conventionally" delete "software protection";
Line 31, after "present invention" delete "is";
Line 34, after "someone else" insert new paragraph -- It is therefore a further object of the present invention to provide a method to verify the identity of a user of data processing apparatus. --;

Column 2,
Line 33, replace "The" with -- One object of the --;
Line 33, "directed" should be deleted;
Line 33, "protecting" should be -- protect --;
Line 38, insert -- the first embodiment of -- before "the present invention";

Column 4,
Lines 56-57, "unen-crypted" should be -- encrypted --.

Signed and Sealed this

Third Day of January, 2006

JON W. DUDAS
*Director of the United States Patent and Trademark Office*

UNITED STATES PATENT AND TRADEMARK OFFICE
CERTIFICATE OF CORRECTION

PATENT NO. : 6,665,797 C1  
APPLICATION NO. : 90/008772  
DATED : August 7, 2012  
INVENTOR(S) : Ho Keung Tse Page 1 of 1

It is certified that error appears in the above-identified patent and that said Letters Patent is hereby corrected as shown below:

Title Page, Item (12) "Keung" should read --Tse--.

Title Page, Item (76) Inventor "Tse Ho Keung" should read --Ho Keung Tse--.

Col. 1, lines 60-65, Claim 1  
Delete "and said access being obtained by human user(s) at a site having no hardware specific for protecting said software desired to be protected from unauthorized use." and insert --through a communication network.--.

Col. 2, lines 8-12, Claim 3  
Delete "before said determining step; and in additional to said processing apparatus," and insert --before said determining step; and said access being provided independently of, at a site said access being obtained by human user(s), any hardware specific for protecting said software desired to be protected from unauthorized use; and in additional to said processing apparatus,--.

Signed and Sealed this  
Fourth Day of December, 2012

David J. Kappos  
*Director of the United States Patent and Trademark Office*

UNITED STATES PATENT AND TRADEMARK OFFICE
CERTIFICATE OF CORRECTION

PATENT NO. : 6,665,797 C1
APPLICATION NO. : 90/008772
DATED : August 7, 2012
INVENTOR(S) : Tse Ho Keung It is certified that error appears in the above-identified patent and that said Letters Patent is hereby corrected as shown below:

In the Specification

Column 2, lines 57-59, replace the text "and said access being obtained by human user(s) at a site having no hardware specific for protecting said at least a part of functionality from unauthorized use." with "and said access being provided independently of, at a site said access being obtained by user(s), any hardware specific for protecting said at least a part of functionality from unauthorized use.".

Column 3, line 8, insert the text --and said software desired to be protected is being made available to said rightful user(s) in the form of protected file(s);-- after "being performed;".

Column 3, line 35, replace "said cost." with "said cost,", to change the incorrect punctuation mark "." therein with a ",".

Signed and Sealed this
First Day of April, 2014

Michelle K. Lee
*Deputy Director of the United States Patent and Trademark Office*

(12) EX PARTE REEXAMINATION CERTIFICATE (9172nd)
United States Patent
Keung (10) Number: US 6,665,797 C1
(45) Certificate Issued: Aug. 7, 2012

(54) COMPUTER APPARATUS/SOFTWARE ACCESS RIGHT MANAGEMENT

(76) Inventor: Tse Ho Keung, North Point Post Office (HK)

Reexamination Request:
No. 90/008,772, Jul. 24, 2007

Reexamination Certificate for:
Patent No.: 6,665,797
Issued: Dec. 16, 2003
Appl. No.: 09/112,276
Filed: Jul. 9, 1998

Certificate of Correction issued Apr. 27, 2004.

Certificate of Correction issued Jan. 3, 2006.

Related U.S. Application Data

(63) Continuation-in-part of application No. 08/587,448, filed on Dec. 1, 1995, now abandoned.

(51) Int. Cl.
*G06F 21/00* (2006.01)
*G06F 1/00* (2006.01)

(52) U.S. Cl. .............................. 713/193; 705/51; 705/59
(58) Field of Classification Search ........................ None
See application file for complete search history.

(56) References Cited

To view the complete listing of prior art documents cited during the proceeding for Reexamination Control Number 90/008,772, please refer to the USPTO's public Patent Application Information Retrieval (PAIR) system under the Display References tab.

*Primary Examiner* — Matthew Heneghan (57) ABSTRACT

A central program comprising a EI sub-program for providing identity information of the rightful user thereof for accessing a network central computer to obtain service(s) or software product(s) or alike, in which a secure operation on an account of the rightful user for payment therefor involved; and a AS sub-program for using the existence of the EI sub-program in a computer as a precondition for authorising use of those software products obtained on that computer. The central program is for managing the use of the individual sub-programs therein so that the AS sub-program can be protected from being copied individually.

FIG. 1 (Amended)

FIG. 2

US 6,665,797 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 30-32:

It is [therefore] *another* object of the present invention [is] to provide a method to discourage a rightful user from copying his software to someone else.

THE DRAWING FIGURES HAVE BEEN CHANGED AS FOLLOWS;

In FIG. 1, "ES Program" is changed to "AS Program".

AS A RESULT OF THE REEXAMINATION IT HAS BEEN DETERMINED THAT:

Claims 11, 12, 14, 15, 18, 19 and 22 are cancelled.

Claims 1, 3, 16 and 21 are determined to be patentable as amended.

Claim 2, 4 and 5, dependent on an amended claim, are determined to be patentable.

New claims 23-26 are added and determined to be patentable.

Claims 6-10, 13, 17 and 20 were not reexamined.

1. A method for protecting publicly distributed software, from unauthorised use, comprising the steps of:
   determining if identity information, is existing in a processing apparatus;
   using a positive result of said determination as a precondition for causing said processing apparatus to provide user access to said software desired to be protected;
   wherein:
      said identity information[, if so existing,] being capable of being used in enabling electronic commerce operation(s) for which rightful user(s) of said software desired to be protected has to be responsible;
      *said access to said software desired to be protected is being provided without causing a said operation being performed and said identity information being specific to said rightful user(s);*
      *and said software desired to be protected is being made available to said rightful user(s) in the form of protected file(s), and said access being obtained by human user(s) at a site having no hardware specific for protecting said software desired to be protected from unauthorized use.*

3. A method for protecting software from unauthorised use, as claimed in claim 1, wherein said operation being [operation related to] *for* making payment from an account of said rightful user(s), for obtaining a service/product;
   *and said responsibility of said rightful user(s) as recited in claim 1 is referring to said payment said rightful user(s) has to be responsible for;*
   *and said access being an access to the use of said software desired to be protected;*
   *and said software desired to be protected being supplied to said rightful user(s), before said determining step;*
   *and in additional to said processing apparatus, said method also being capable of being used on at least one more procesing apparatus.*

16. A method for protecting software from unauthorised use, comprising the steps of:
   (a) obtaining by protection software running on a processing apparatus, say, first processing apparatus, first information from the user thereof;
   (b) determining by said protection software, from said processing apparatus second information related to the hardware or/and software thereof for future reference in step (c) below, in response to said first information obtained being consistent with third information contained in said protection software, thereafter
   (c) authenticating a processing apparatus, say, second processing apparatus, *as being said first processing apparatus,* basing on at least a part of said second information;
   (d) using a positive result of said authentication as a precondition for permitting use of said software desired to be protected on said second processing apparatus;
      wherein said third information being confidential information of a rightful user of said software [desire] *desired* to be protected and being necessary for enabling electronic commerce transaction(s) for which said rightful user has to be responsible; and said method is being performed without causing a said transaction take place.

21. A method for verifying identity of a user of a data processing apparatus, comprising the steps of:
   receiving, by said data processing apparatus, information specific to [a] *said* user and necessary for accessing an account of said user;
   verifying said account being valid, by an electronic transaction system by use of said information received by said data processing apparatus;
   using by said data processing apparatus, a positive result of said verification as a precondition for providing user access to at least a part of the functionality of said data processing apparatus;
      wherein said method is being performed without charging said account and said at least a part of functionality being not related to said validity status of said account;
   *and functionality identical as said at least a part of functionality being made available to at least one more user other than said user;*
   *and said access being obtained by human user(s) at a site having no hardware specific for protecting said at least a part of functionality from unauthorized use.*

23. *A method for protecting publicly distributed software, from unauthorised use, comprising the steps of:*
   *authenticating identity information associated with a processing apparatus;*
   *using a positive result of said authentication as a precondition for causing said processing apparatus to provide user access to said software desired to be protected;* wherein:

said identity information being capble of being used in enabling electronic commerce operation(s) for which rightful user(s) of said software desired to be protected has to be responsible;

said access to said software desired to be protected is being provided without causing a said operation being performed;

and in additional to said processing apparatus, said method also being capable of being used on at least one more processing apparatus and said identity information being specific to said rightful user(s).

24. A method for protecting software which being made available to a person in the form of protected file(s) from unauthorised use, by restricting the use thereof to be under control of said person, comprising a sub-method; said sub-method comprising the steps of:

(a) establishing a communicaton between a processing apparatus, say, first processing apparatus and a remote electronoic transaction system;

(b) verifying said person having a valid account, by said remote electronic transaction system, basing on authenticated information related to said person, said authenticated information being information communicated to said remote electronic transaction system from said processing apparatus and then authenticated by said remote electronic transaction system;

(c) using a positive result of said verification as a pre-condition for permitting use of said software on said first processing apparatus;

wherein said sub-method a cost is being charged from said account; and thereafter, said sub-method being capable of being used on a processing apparatus, say, second processing apparatus, without said cost.

wherein said use of said software being permitted independently of, at a site said person using, said software, any hardware specific for protecting said software from unauthorized use.

25. A method for protecting publicly distributed software, from unauthorised use, comprising the steps of:

obtaining first information from a user of a processing apparatus having an identity software;

using said first information received being correct as a pre-condition for causing said processing apparatus to provide user access to said software desired to be protected;

wherein:

said identity software being for providing a second information specific to rightful user(s) of said software desired to be protected, if said correct first information is being obtained from a user thereof; and said second information being capable of being used in enabling electronic commerce operation(s) for which said rightful user(s) has to be responsible;

said access to said software desired to be protected is being provided without causing a said operation being performed;

and said software desired to be protected is being made available to said rightful user(s) in the form of protected file(s) and is being received by said rightful user(s), through a communication network.

26. A method for protecting software from unauthorised use, as claimed in claim 25, wherein said operation being for making payment from an account of said rightful user(s) ;

and said responsibility of said rightful user(s) as recited in claim 25 is referring to said payment said rightful user(s) has to be responsible for;

and said first information being a password;

and said access being an access to the use of said software desired to be protected;

and said software desired to be protected being supplied to said rightful user(s), before said receiving step;

and said access being provided independently of, at a site said access being obtained by human user(s), any hardware specific for protecting said software desired to be protected from unauthorized use;

and in additional to said processing apparatus, said method also being capable of being used on at least one more processing apparatus.

* * * * *